(12) United States Patent
Kuhl et al.

(10) Patent No.: US 8,494,506 B2
(45) Date of Patent: Jul. 23, 2013

(54) CALL DESTINATION NUMBER MAPPING METHODS, DEVICES AND SYSTEMS

(75) Inventors: Lawrence Edward Kuhl, Waterloo (CA); Colin Mark Werner, Kitchener (CA); Christopher Lyle Bender, Waterloo (CA); Scott William Totzke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 342 days.

(21) Appl. No.: 12/703,819

(22) Filed: Feb. 11, 2010

(65) Prior Publication Data

US 2011/0085527 A1    Apr. 14, 2011

Related U.S. Application Data

(60) Provisional application No. 61/250,753, filed on Oct. 12, 2009.

(51) Int. Cl.
*H04M 3/42* (2006.01)
*H04M 3/00* (2006.01)

(52) U.S. Cl.
USPC .. 455/417; 455/418; 379/211.01; 379/213.01

(58) Field of Classification Search
USPC ............... 455/415–419, 41.1, 405, 406, 551, 455/459, 460, 564–567; 379/88.19, 88.2, 379/88.21, 207.14, 207.15, 213.01; 370/310.2, 370/328, 338, 351–356
See application file for complete search history.

(56) References Cited

U.S. PATENT DOCUMENTS

| | | | |
|---|---|---|---|
| 4,988,991 A * | 1/1991 | Motegi | 340/7.52 |
| 5,459,774 A | 10/1995 | Breeden | |
| 6,360,108 B1 | 3/2002 | Rogers | |
| 6,542,733 B1 * | 4/2003 | Dennis | 455/414.1 |
| 6,580,789 B1 | 6/2003 | Simpson et al. | |
| 6,813,346 B2 * | 11/2004 | Gruchala et al. | 379/211.01 |
| 6,870,927 B1 | 3/2005 | Theis | |
| 6,968,214 B2 * | 11/2005 | Bumiller | 455/564 |
| 2002/0160815 A1 * | 10/2002 | Patel et al. | 455/564 |
| 2004/0203757 A1 | 10/2004 | Nasielski | |
| 2006/0177043 A1 | 8/2006 | Li et al. | |
| 2007/0037561 A1 * | 2/2007 | Bowen et al. | 455/418 |
| 2008/0188227 A1 * | 8/2008 | Guedalia et al. | 455/445 |

OTHER PUBLICATIONS

Extended European Search Report for EP 10153280.2 dated Jun. 5, 2010.

* cited by examiner

*Primary Examiner* — Kent Chang
*Assistant Examiner* — San Htun
(74) *Attorney, Agent, or Firm* — Ridout & Maybee LLP (57) ABSTRACT

A call destination mapping method executes on a mobile communication device. The mobile communication device requests a call action within the device for a first call destination number of a call destination, maps the first call destination number to a second call destination number in accordance with one or more call destination mapping rules stored on the device, and replaces the first call destination number in the call action with the second call destination number.

17 Claims, 5 Drawing Sheets

CALL DESTINATION NUMBER MAPPING METHODS, DEVICES AND SYSTEMS

CROSS-REFERENCE TO RELATED APPLICATIONS

This application claims priority from, and the benefit of, the filing date of U.S. Patent Application No. 61/250,753 filed 12 Oct. 2009 under title CALL DESTINATION NUMBER MAPPING METHODS, DEVICES AND SYSTEMS. The contents of the above application is hereby incorporated by reference into the Detailed Description hereof.

TECHNICAL FIELD

The present disclosure relates generally to calls from a mobile communication device.

BACKGROUND

There are a plethora of options for placing calls on mobile communication devices. New options are being constantly added, while old options are often changed or removed altogether.

BRIEF DESCRIPTION OF THE DRAWINGS

Like reference numerals are used in the drawings to denote like elements and features.

DETAILED DESCRIPTION OF EXAMPLE IMPLEMENTATIONS

Implementations of the present disclosure are not limited to any particular operating system, mobile device architecture, server architecture, or computer programming language.

Reference is made in this description to "calls", it will be appreciated that the described systems and methods are applicable to all types of calls, including session-based communications and are not limited to voice calls, unless specifically indicated.

The present disclosure provides an example implementation of a call destination mapping method that includes a mobile communication device requesting a call action within the device for a first destination number of a call destination accessible by the mobile communication device through a wireless network, mapping the first call destination number to a second call destination number in accordance with one or more call destination mapping rules stored on the device, and replacing the first call destination number in the call action with the second call destination number.

Call actions include any request within a mobile communication device relating to a call destination number of an existing call or a call to be initiated. For example, if a call is being initiated then a call action could be to start a call (START CALL). Typically a call action is requested by a phone application and addressed to a wireless communication subsystem to exchange radio frequency signals with a wireless network to perform communication functions regarding the call destination number, such as the connection of a call from the wireless network to a PSTN telephone (public switched telephone network, sometimes referred to as POTS, plain old telephone service), to a SIP (session initiation protocol) phone, or to another mobile communication device, possibly through one or more further wired or wireless networks. Example call destination numbers for a PSTN telephone or a cellular telephone would include a seven or ten digit telephone number in North America, plus long distance prefix. An example call destination number for a SIP or other voice-over-IP (VoIP) destination would be an IP address telephone. Other call actions could include a request to transfer an existing call to a call destination number (transfer), or a request to add a party at a call destination number to a call (conference).

Example implementations are provided wherein a plurality of call destination rules can be stored on the mobile communication device, relative priorities can be assigned to the rules, and the first call destination number can be mapped sequentially in accordance with a plurality of the call destination number mapping rules through one or more intermediate call destination numbers to the second call destination number.

Further example implementations are provided wherein a calling number destination rule includes a mobile communication device state condition, and wherein prior to mapping a destination number to another destination number in accordance with the call destination number rule, the mobile communication device determines if a device state matches the state condition, and maps the destination number to another destination number only if the mobile communication device state matches the state condition for the rule. The mobile communication device may determine if a mobile device state matches a state condition by accessing on-device functionality.

Other example implementations are provided wherein, prior to storage on the device, the rules are transmitted to the device by an administration server. The rules received by the mobile communication device may be stored in memory protected from user access. Example implementations are also provided wherein the mobile communication device is one of a plurality of mobile communication devices including rules transmitted to the mobile communication devices by the administration server. In some example implementations the rules transmitted to the mobile communication devices by the administration server are common to a plurality of the mobile communication devices for the administration server.

Still further example implementations are provided wherein the wireless network is a cellular wireless network. In some example implementations the rules include rules for replacing a first call destination number that is a long distance call destination number with a second call destination number that includes a long distance network access dialing code. Where the rule is for replacing the first call destination number that is a long distance call destination number with a second call destination number that includes a long distance network access dialing code, the rule may include for example a location state condition and a corresponding long distance network access dialing code for the location state condition. Further example details of the above example method implementations, and additional example implementations, will be described herein.

The present disclosure also provides an example implementation of a mobile communication device including a central processing unit, wireless communications capabilities, and a call destination mapping module providing computer-readable instructions which, when executed on the central processing unit, cause the mobile communication device to carry out the example methods. Further example details of the above example structural implementation, and additional example structural implementations, will be described herein.

The present disclosure further provides an example implementation of a computer program product including a computer readable medium, and stored on the computer-readable medium computer-readable instructions which, when executed on the central processing unit, cause the mobile communication device to carry out one or more of the example methods. Further example details of the above example computer program product, and additional example computer program product implementations, will be described herein.

Figure 1:
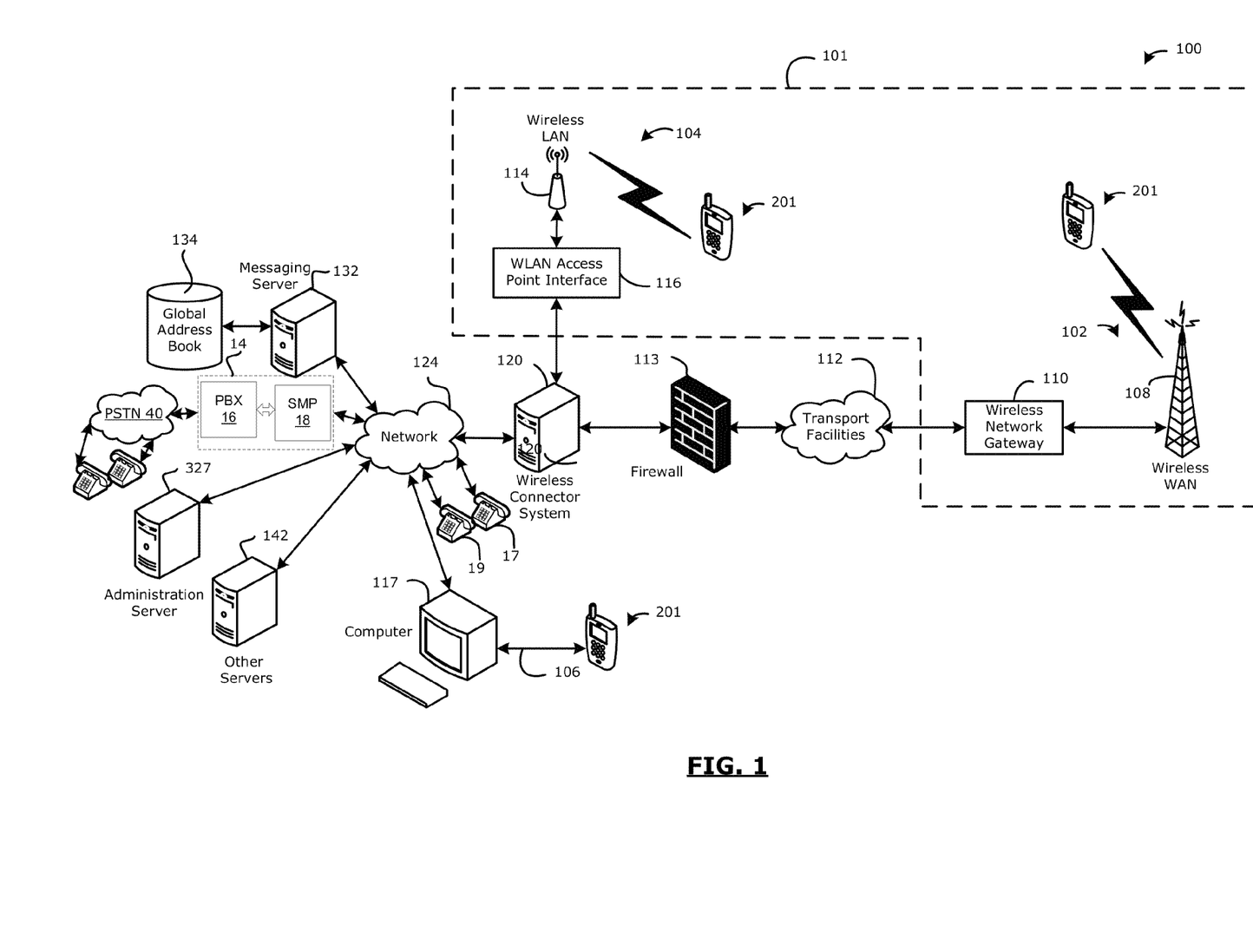
FIG. 1 is a block diagram illustrating a communication system including a mobile communication device in which example implementations of the present disclosure can be applied.

Reference is first made to FIG. 1 which shows in block diagram form a communication system 100 in which example implementations of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some implementations, the mobile communication devices 201 are configured to communicate over both the WWAN 102 and WLAN 104, and to roam between these networks. In some implementations, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some implementations, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some implementations, conforms to IEEE 802.11x standards (sometimes referred to as Wi-Fi) such as, for example, the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as internet content or content from an organization's internal servers to the mobile communication devices 201 in the wireless network 101, and an application server for implementing server-based applications.

The global address book 134 comprises electronic contact records created and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile communication devices 201. In some implementations, communications between the wireless connector system 120 and the mobile communication devices 201 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 132 or application servers 136. Conversely, the wireless connector system 120 sends data packets received, for example, from the messaging server 132 or other server 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 132 and application server 136.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some implementations, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
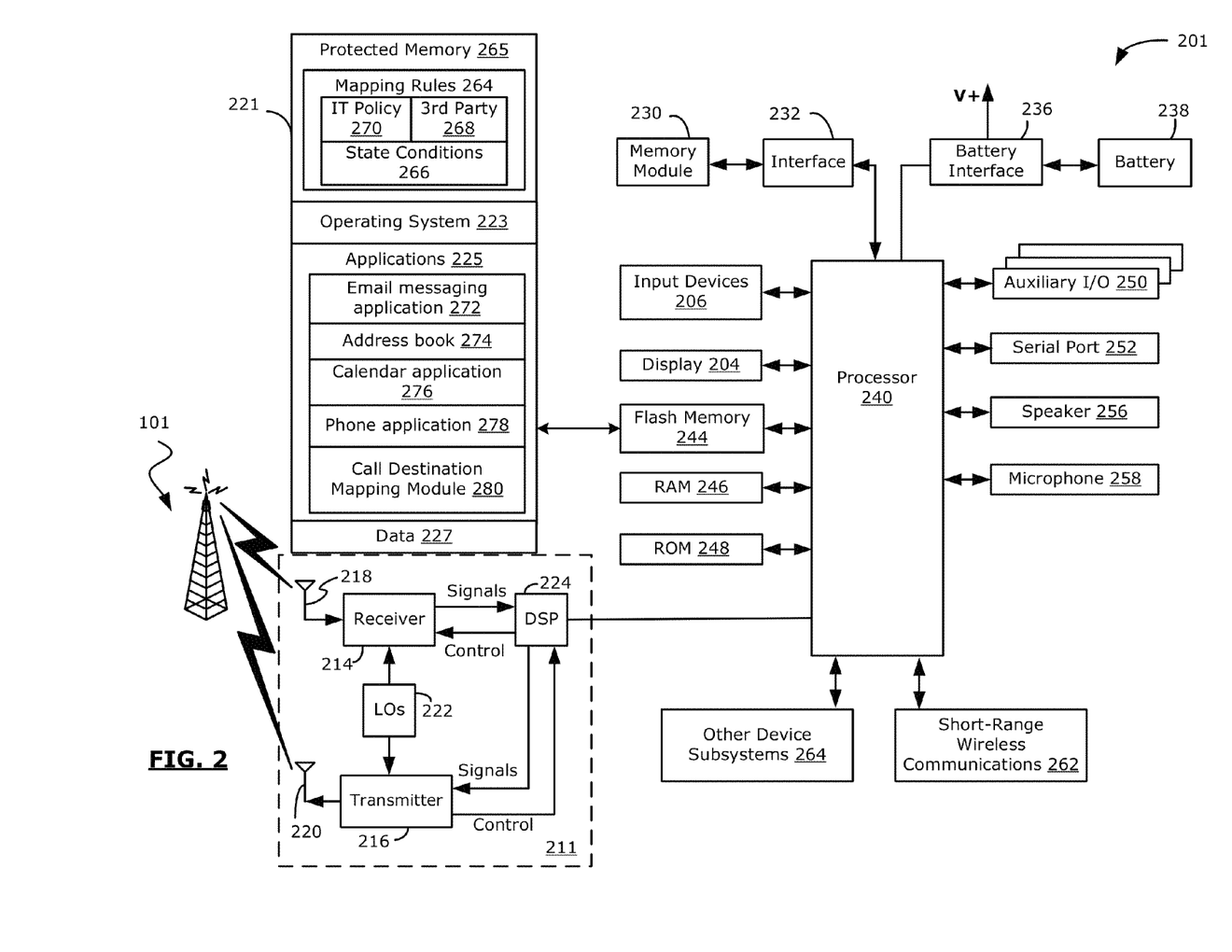
FIG. 2 is a block diagram illustrating a mobile communication device in accordance with one example implementation of the present disclosure.

Reference is now made to FIG. 2 which illustrates a mobile device 201 in which example implementations described in the present disclosure can be applied. The mobile device 201 is a two-way communication device having data and voice communication capabilities, and the capability to communicate with other computer systems, for example, via the Internet. Depending on the functionality provided by the mobile device 201, in various implementations the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some implementations. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and call destination mapping module 280. Example implementations of a call destination mapping module 280 will be discussed in detail later herein. It is recognized that the call destination mapping module 280 and its various components as described herein can form a discrete module running on the device 201, or the functions of the call destination mapping module 280 can be distribution on the device 201 as separate modules or integrated within other existing modules as desired. Such discrete or distributed implementations all fall within the implementations of a call destination mapping module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some implementations, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some implementations, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example implementation is the flash memory 244. In various implementations, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Call destination mapping rules 264, including applicable state conditions 266, can be stored separately from the call destination mapping module 280. The call destination mapping module 280 acts as a listener for call actions from phone application 278. If a call action is requested then the call destination mapping module 280 takes control of the call action before the call action is sent to the wireless communications subsystem 211.

The call destination mapping module 280 reviews the rules 264 to determine if any rule 264 applies to the call destination number in the call action. For example, a rule 264 can be "if the call destination number matches a call destination number pattern then replace the first digit with a dialing access code". For example, in a long distance rule where an enterprise has entered into a long distance with a long distance provider that requires dialing a long distance network access code, such as a local phone number, followed by the original call destination number less a country code, such as "1" for North America. Upon seeing the prefix one a dialing rule could replace the "1" in the call destination number with the long distance network access code. The call action could then be forwarded on to the wireless communications subsystem 211 to process the call action, or alternatively, the call action could be returned to the phone application 278 to call the wireless communication subsystem 211.

As part of the rule 264 review, any mobile communication device state condition 266 for the rule is also evaluated to determine if a mobile communication device state matches the state condition 266. If mobile device states match state conditions can be determined, for example, by accessing on-device functionality, such as one or more auxiliary I/O subsystems 250, applications 225, or operation system 223 functions. An example of a location state condition 266 has been discussed previously. Another example state condition 266 could be current device time. The current device time could be obtained through a device clock, for example, through a clock application of the application 225 that is often provided on a mobile communication device 201. The time could be used as a state condition, for example, to determine which long distance network dialing access code to utilize at a particular time.

Administration server 327 is configured to enforce IT (information technology) policies on the mobile communication devices 201. IT policies are rules which govern the functionality of the mobile communication devices 201. As part of the IT policies a call destination mapping IT policy 270 could be utilized as part of the mapping rule 264 to provide both mapping rules and 264 and the state conditions 266 forming part of the mapping rules 264. As such, the general application of IT policies is discussed below and it is understood that the discussion applies to IT policy 270. It is also noted that third party software applications could be provided with ability to install third party policies 268, for example using JavaScript (trade mark of Sun Microsystems), from the device 201 to allow for additional flexibility to access the methods and structures described herein.

The administration server 327 may periodically transmit IT policy messages to enforce, modify, or terminate IT policies on the connected computing devices. The administration server 327 transmits the IT policy messages through the wireless network 101 to its managed mobile communication devices 201 or via the physical interface (e.g., serial data port 252 such as a USB port) or short-range wireless communication interface (e.g., Bluetooth® connection) 106 when connected to the user's enterprise computer terminal 117. The IT policy messages may be security policies (such as data protection security policies), information and/or security settings regarding these policies, and/or commands to be executed by the mobile communication devices 201. The IT policies can be set by an IT administrator of the enterprise network 124 by sending an appropriate IT policy message to the mobile communication devices 201 managed by the administration server 327. The periodic transmission of IT policy messages from the administration server 327 the managed mobile communication devices 201 assists in ensuring, among other things, that each of the mobile communication devices 201 is kept up to date with the latest IT policy. The content and frequency of IT policy messages may be set by the IT administrator. In at least some implementations, the administration server 327 generates a private and public key pair for each mobile communication device 201 to authenticate the IT policy messages. The IT policy private key is stored in the administration server 327. The IT policy public key is stored on the mobile communication device 201. The administration server 327 digitally signs all IT policy messages using the IT policy public key which uses the IT policy public key to authenticate the digital signature in received IT policy messages.

In one implementation, elements of the call destination number mapping rules 264 are implemented via an IT policy message which is pushed out to the mobile communication devices 201. Using IT policy messages the mobile communication devices 201 can be instructed to enforce, modify, or terminate aspects of the call destination number mapping rules 264. Using IT policy messages in this manner allows call destination number mapping rules 264 to be added to mobile communication devices 201 already managed by the administration server 327, and in new mobile communication devices 201 which are added to a list of devices managed by the administration server 327 (including new users, device replacements or upgrades, or device switches). In some implementations, the IT administrator has the option of setting the IT policy globally for all mobile communication devices 201 managed by the administration server 327, or for groups or classes of mobile communication devices 201 managed by the administration server 327, or for one or more individual communication devices managed by the administration server 327. IT policies administered in this manner allow for central administration and distribution of rules 264 without requiring individual user input. This process can be invisible to the user.

In some implementations, the rules 264 are stored in protected memory 270 of the mobile communication device 201, for example, in flash memory 244. The protected memory 270 is protected from user access, device wipes (for example, device wipes initiated by the user, or resulting from device replacements or switches, or from triggered data security protections) which erase data stored on the mobile communication device 201, or both. Access to the protected memory 270 is also restricted to authorized applications, and typically authorized applications are restricted to authorized uses. Storage of the rules 264 in protected memory 270 prevents the user of the mobile communication device 201 from accessing the rules 264 and tampering with the rules 264 in an attempt to modify or delete the rules 264, or otherwise prevent or alter the rules 264. Methods of implementing memory protection are known in the art and will not be described.

Generally, the IT policy rules 270 may only be added, updated, or removed via an IT policy message sent via the administration server 327. In this way, IT policy rules 270 control authority is restricted to the administration server 327 and the IT administrator. Typically, the rules 264 will only be accessible by the mobile communication device 201 when the access request is received from an authorized program application such as the call destination number mapping module 280. Even in such cases, access is typically limited to authorized purposes.

Figure 3:
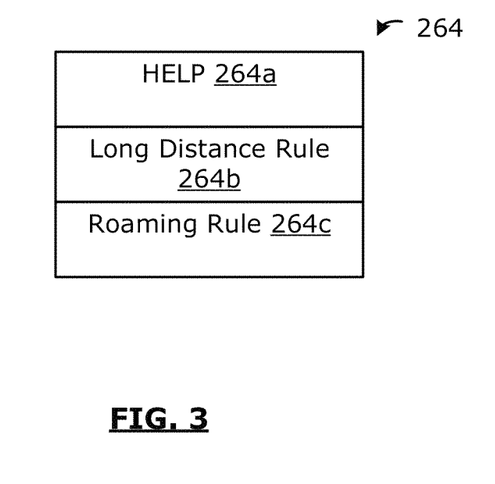
FIG. 3 is a block diagram illustrating example call destination rules for use in the device of FIG. 2.

Referring to FIG. 3, example rules 264 are shown. Each rule 264 is listed with a suffix, "a", "b", "c" . . . , to distinguish the rules 264 in the FIG. for ease of reference.

Rule 264a provides an example "HELP" call destination number mapping rule 264a. For example, rule 264a could provide that if a call action is requested for the call destination number 4357 (numeric equivalent of HELP) in order to access a corporate help desk. The rule 264a maps the number 4357 to a full PSTN phone number that can be dialed on the network to reach a corporate help desk, for example at 14165555555 in North America. The rule 264a could include a location state condition 266, such that different help desk call destination numbers could be provided for different locations. For example, a location state condition of Europe could have a European Help desk call destination number, while a location state condition of North America could have a North American help desk call destination number. The help desk rule 264a could be one rule 264a with alternative state conditions 266 and mapped call destination numbers, or the help desk rule 264a could be two separate rules 264a each with separate state conditions and mapped call destination number.

Rule 264b provides an example long distance call destination number mapping rule 264b, example implementations of which have been described earlier in this description. The rule 264b could be applied to the call destination number 14165555555 from the application of rule 264a. The order of rules 264a, 264b, 264c provides assigned priorities for the application of the rules 264a, 264b, 264c.

Rule 264c provides an example roaming call destination mapping rule 264c. For example, rule 264c could provide that if a call action is requested for a PSTN call destination number representing a corporate headquarters then the rule 264c will check the roaming status condition of the device 201 through a roaming indicator auxiliary i/o subsystem 250 and map the call destination number to an unpublished toll free call destination number (such as a 1-800 number) if the device 201 is in a home (non-roaming) coverage roaming state condition 266 in order to reduce costs, but will use the regular POTS number when device 201 is in a roaming coverage roaming state condition 266. This example roaming rule 264c assumes that the geographic roaming coverage and the geographic toll free number coverage are the same. For example, a mobile communication device 201 may have a rate plan for free roaming in North America, and a toll free number may also cover North America. Alternative rules can be developed for different situations.

In the example implementation the rules 264 a, 264b, 264c are assigned priorities by the mapping module simply through the order in which the rules 264a, 264b, 264c appear in the rules 264. Thus, the mapping module 280 applies each rule 264 in sequence. If the application of one rule (eg. 264a) results in replacement of the call destination number then the next rule (eg. 264b) is applied to the replaced call destination number. Any call destination numbers that are replaced after the first (original) call destination number can be referred to as intermediate call destination numbers. Many alternate methods to assign priorities are possible, and will be evident to those skilled in the art in light of the description herein. For example, rules 264 could be assigned priorities through a priority field, not shown, in the rule 264 that could be searched by the mapping module to determine the order in which the rules 264 are to be applied.

Multiple devices 201 can be administered through the administration server 327. The administration server 327 can provide common rules to a plurality of devices 201.

State conditions can be based, for example, on location information determined at the device 201, for example, by checking a GPS location of the device 201 using a GPS auxiliary I/O subsystem 250. Other methods of determining location information can be derived from cell towers with which the device 201 is communicating. Also, presence information can be used, for example, from on-device applications such as the calendar application that may indicate the anticipated location of the user on a particular day and time. As will be evident to those skilled in the art there are other methods of determining a location for the device 201.

An example implementation of a rule 264 employing a location state condition 266, could be a device location long distance rule 264 governing replacement of a long distance call destination number by a call destination number including a long distance network access code. For example if a call action is requested for a first call destination number, a long distance mapping rule 264 is applied. The rule has a location state condition 266 that must be matched by the device 201 state before the rule can be applied. The device 201 determines a location for the device 201 as described above.

Figure 4:
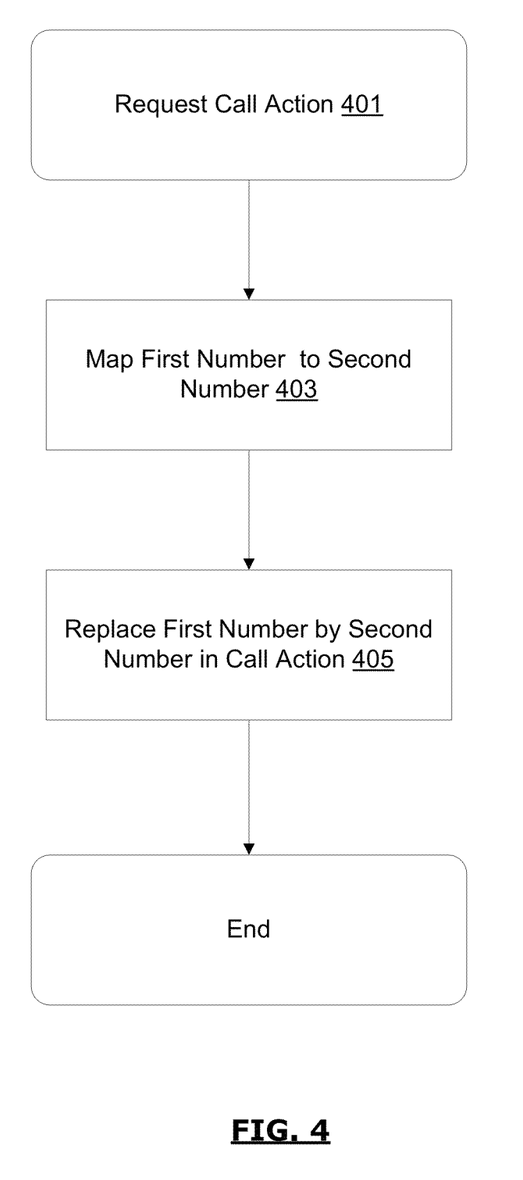
FIG. 4 is a flowchart illustrating an example method of a call destination mapping method in accordance with one example implementation of the present disclosure.

Referring to FIG. 4, an example method by which the mobile communication device 201 can operate is set out. Such method can be embodied primarily in the mapping module 280 executing on mobile communication device 201. At 401, the mobile communication device 201 requests a call action within the device 201 for a first call destination number of a call destination. At 402, the mobile communication device 201 maps the first call destination number to a second call destination number in accordance with one or more call destination mapping rules stored on the device. At 405, the mobile communication device 201 replacing the first call destination number in the call action by the second call destination number.

Figure 5:
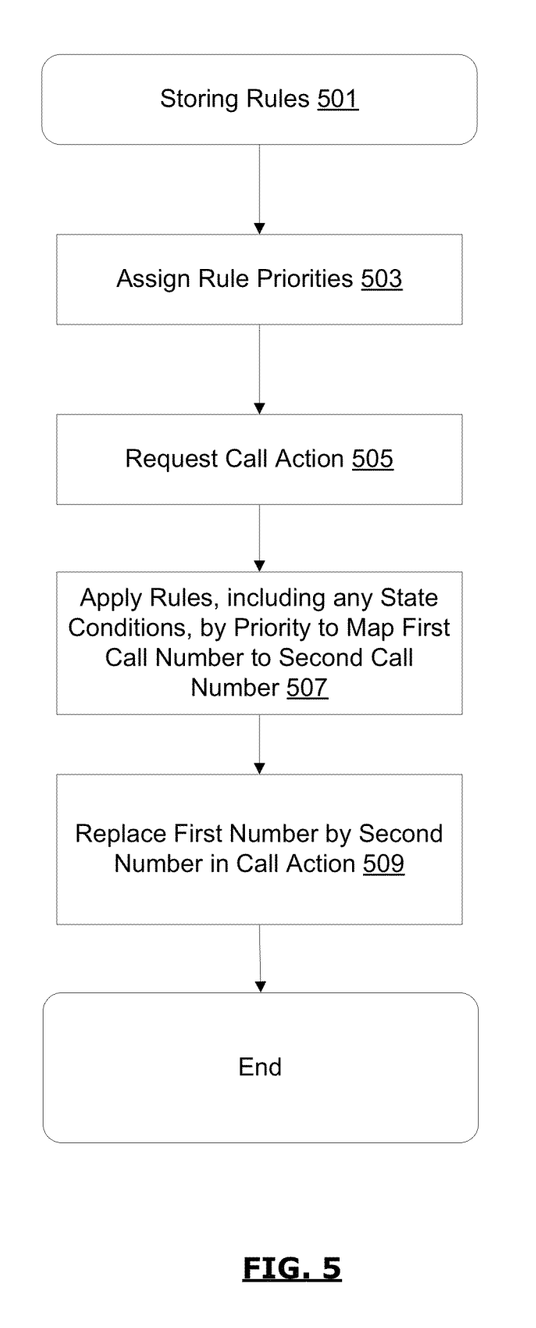
FIG. 5 is a flowchart illustrating a further example method of a destination method in accordance with another example implementation of the present disclosure.

Referring to FIG. 5, a further example method by which the mobile communication device 201 can operate is set out. At 501, prior to requesting a call action, the mobile communication device 201 stores a plurality of call destination rules 264 on the mobile communication device 201. At 503, the mobile communication device assigns relative priorities to the rules 264. At 505, a call action is requested by the mobile communication device 201 from within the mobile communication device 201. At 507, the mobile communication device mapping the first call destination number in accordance with a plurality of the call destination number mapping rules 264 by priority through one or more intermediate call destination numbers to the second call destination number; provided that the mobile communication device 201, prior to mapping a destination number to another destination number in accordance with a call destination number rule, determines if a mobile communication device state matches the state condition 266 for the rule 264, and the mobile communication device 201 maps the destination number to another destination number only if the mobile communication device state matches the state condition 266 for the rule 264. At 509, the first call destination number is replaced by the second call destination number in the call action.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The various implementations presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described implementations may be selected to create alternative implementations comprised of a sub-combination of features which may not be explicitly described above. In addition, features from one or more of the above-described implementations may be selected and combined to create alternative implementations comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A call destination mapping method executing on a mobile communication device, the method comprising the mobile communication device:
   storing a plurality of call destination mapping rules on the mobile communication device;
   assigning relative priorities to the call destination mapping rules;
   requesting a call action within the device for a first call destination number of a call destination;
   mapping the first call destination number to an intermediate call destination number, in accordance with a first call destination mapping rule among the plurality of call destination mapping rules;
   mapping the intermediate call destination number to a second call destination number in accordance with a second call destination mapping rule among the plurality of call destination mapping rules, the second call destination mapping rule assigned to a lower relative priority than the first call destination mapping rule; and
   replacing the first call destination number in the call action with the second call destination number.

2. The method of claim 1 wherein the plurality of call destination mapping rules further comprises a further calling number destination rule including a mobile communication device state condition, and the method further comprises, prior to mapping a destination number to another destination number in accordance with the call destination number rule, the mobile communication device:
   determining if a mobile communication device state matches the state condition, and mapping the destination number to another destination number only if the mobile communication device state matches the state condition for the further calling number destination rule.

3. The method of claim 2 wherein the mobile communication device determines if a mobile device state matches a state condition by accessing on-device functionality.

4. The method of claim 1 further comprising initiating a call from the mobile communication device in accordance with the call action to the second destination number.

5. The method of claim 4 further comprising initiating the call through a wireless wide area network.

6. The method of claim 1 further comprising, prior to storage on the device, the mobile communication device receives the rules from an administration server.

7. The method of claim 6 wherein the mobile communication device is one of a plurality of mobile communication devices receiving rules from the administration server.

8. The method of claim 7 further comprises initiating the call based on the rules transmitted to the mobile communication devices by the administration server are common to a plurality of the mobile communication devices for the administration server.

9. The method of claim 1 wherein storing the plurality of call destination mapping rules comprises storing the rules in memory protected from user access.

10. The method of claim 1 further comprising replacing, in accordance with a long distance call destination mapping rule, a first call destination number that is a long distance call destination number with a second call destination number including a long distance network access dialing code.

11. The method of claim 1 further comprising replacing, in accordance with a long distance call destination mapping rule including a location state condition and a corresponding long distance network access dialing code for the location state condition, a first call destination number that is a long distance call destination number with a second call destination number including a long distance network access dialing code.

12. A mobile communication device comprising:
a central processing unit;
a memory;
wireless communications capabilities; and
a call destination mapping module including computer-readable instructions which, when executed on the central processing unit, cause the mobile communication device to:
store a plurality of call destination mapping rules in the memory;
assign relative priorities to the call destination mapping rules;
map a first call destination number of a call action within the device for a first call destination number of a call destination to an intermediate call destination number, in accordance with a first call destination mapping rule among the plurality of call destination mapping rules;
map the intermediate call destination number to a second call destination number in accordance with a second call destination mapping rule among the plurality of call destination mapping rules, the second call destination mapping rule assigned to a lower relative priority than the first call destination mapping rule; and
replace the first call destination number in the call action with the second call destination number.

13. The device of claim 12 wherein the call destination mapping module further includes computer-readable instructions which, when executed on the central processing unit, cause the mobile communication device to map a further destination number to another further destination number in accordance with a further call destination number rule, among the plurality of call destination mapping rules, the further call destination number rule including a mobile communication device state condition and causing the mobile communication device to:
determine if a mobile communication device state matches the state condition; and
map the further destination number to the another further destination number only if the mobile communication device state matches the state condition for the further call destination number rule.

14. The device of claim 13 wherein the call destination mapping module further including computer-readable instructions which, when executed on the central processing unit, cause the mobile communication device to determine if a mobile device state matches a state condition by accessing on-device functionality.

15. A computer program product including a non-transitory computer readable medium, and stored on the non-transitory computer-readable medium computer-readable instructions which, when executed on a central processing unit of a mobile communication device having wireless communication capabilities, cause the mobile communication device to:
store a plurality of call destination mapping rules on the mobile communication device;
assign relative priorities to the call destination mapping rules;
map a first call destination number of a call action within the device for a first call destination number of a call destination to an intermediate call destination number, in accordance with a first call destination mapping rule among the plurality of call destination mapping rules;
map the intermediate call destination number to a second call destination number in accordance with a second call destination mapping rule among the plurality of call destination mapping rules, the second call destination mapping rule assigned to a lower relative priority than the first call destination mapping rule; and
replace the first call destination number in the call action with the second call destination number.

16. The product of claim 15 wherein the plurality of call destination mapping rules further comprises a further calling number destination rule including a mobile communication device state condition and the product further comprises the computer-readable instructions which, when executed on the central processing unit, cause the mobile communication device to:
map a destination number to another destination number in accordance with the further call destination number rule;
determine if a mobile communication device state matches the state condition; and
map the destination number to another destination number only if the mobile communication device state matches the state condition for the further call destination number rule.

17. The product of claim 16 further comprising the computer-readable instructions which, when executed on the central processing unit, cause the mobile communication device to determine if a mobile device state matches a state condition by accessing on-device functionality.

\* \* \* \* \*